United States Patent [19]

Güls

[11] Patent Number: 5,396,841
[45] Date of Patent: Mar. 14, 1995

[54] LETTERPRESS PRINTING PLATE HAVING PRINTING SURFACES WITH A LOW SURFACE TENSION, AND METHOD OF MAKING

[75] Inventor: Dieter Güls, Bonn, Germany

[73] Assignee: Bonner Zeitungsdruckerei un Verlangsanstalt H. Neusser GmbH & Co. KG, Bonn, Germany

[21] Appl. No.: 986,238

[22] Filed: Dec. 7, 1992

Related U.S. Application Data

[63] Continuation-in-part of Ser. No. 799,860, Nov. 27, 1991, abandoned, which is a continuation of Ser. No. 501,331, Mar. 26, 1990, abandoned, which is a continuation of Ser. No. 241,441, Sep. 7, 1988, abandoned.

[30] Foreign Application Priority Data

Sep. 9, 1987 [DE] Germany .......... 37 30 193.4

[51] Int. Cl.$^6$ .......................... B41N 1/12
[52] U.S. Cl. .................. 101/395; 101/401; 101/401.1; 101/492; 430/306
[58] Field of Search .......... 101/376, 379, 380, 395, 101/401, 401.1, 467, 491, 492; 430/306

[56] References Cited

U.S. PATENT DOCUMENTS

| | | | |
|---|---|---|---|
| 3,025,186 | 3/1962 | Eekhout | 101/401 |
| 3,221,654 | 12/1965 | Jernt | 101/395 |
| 3,255,695 | 6/1966 | Johnson et al. | 101/211 |
| 3,260,779 | 7/1966 | Tarbox | 101/395 |
| 3,554,836 | 1/1971 | Steindorf | 101/492 |
| 3,832,948 | 9/1974 | Barker | 101/401.1 |
| 3,910,187 | 10/1975 | Cords | 101/453 |
| 4,178,850 | 12/1979 | Helmig | 101/451 |
| 4,528,909 | 7/1985 | Rigg et al. | 101/395 |
| 4,765,243 | 8/1988 | Schiefer et al. | 101/451 |

OTHER PUBLICATIONS

"Newspaper Technology", Man Roland USA, Inc.

*Primary Examiner*—Edgar S. Burr
*Assistant Examiner*—Stephen R. Funk
*Attorney, Agent, or Firm*—Sprung Horn Kramer & Woods

[57] ABSTRACT

A letterpress printing method is disclosed wherein a printing plate, having a plastic surface with a critical surface tension in the range of approximately 18-35 mN/m, is engraved or otherwise provided with raised ink-bearing impression sites and the printing plate is used for printing in a letterpress printing machine. As examples, the plastic surface of the printing plate may comprise a fluoropolymer, polytetrafluoroethylene or a copolymer of tetrafluoroethylene and hexafluoropropylene. The low surface tension is shown to enhance the printing quality in this environment.

10 Claims, 3 Drawing Sheets

LETTERPRESS PRINTING PLATE HAVING PRINTING SURFACES WITH A LOW SURFACE TENSION, AND METHOD OF MAKING

CROSS REFERENCE TO RELATED APPLICATIONS

This application is a continuation-in-part of application Ser. No. 799,860, filed Nov. 27, 1991, which, in turn, was a continuation of application Ser. No. 501,331, filed Mar. 26, 1990, which, in turn, was a continuation of application Ser. No. 241,441, filed Sep. 7, 1988. All of these prior, parent applications are now abandoned.

BACKGROUND OF THE INVENTION

The invention relates to a printing form, specifically a printing plate, with impression sites made out of plastic.

Printing is the multiplication of information in the form of dots in a screen, characters, or solid black and white, color-spot, or multicolor areas. One objective is the highest possible quality of reproduction at an acceptable expense. Overall quality criteria that are independent of what printing method is employed are the precision of contours and graphics elements, the uniformity and density of the dots or characters, the uniformity of the screen and the maintenance of the white spaces between the dots in screen-printed solid areas, and uniform coverage in solid areas. Precise color-register tolerance is also significant in multicolor printing, and generally the uniform spread of the ink over the surface of the plate and over time.

The quality of newspaper printing is essentially dictated by the demands of the market, reader habits, the needs of advertisers, the competition, and the technical potential in relation to economics. Offset printing generally results in higher quality, although material developments and the use of photopolymer printing plates have also led to progress in letterpress newspaper printing.

Letterpress, however, demands special and relatively expensive efforts to attain the average quality of offset.

The current versions of letterpress use inks that contain minerals and vegetable materials and differ in viscosity and consistency, with their properties finally being determined by the material being printed, coverage requirements, ink absorption and bleed-through, drying properties, and smear resistance. A wide range of inking devices, from simple lifting devices through overshot fountains to the up-to-date anilox system, are employed to work the ink, control its flow, and ink the printing plate. This wide range, however, results in differences that, from the aspect of design, necessitate a wide selection of very different inks. Since the level of squeeze necessary to attain satisfactory reproduction can only be decided page by page during the printing process and the ratio of space to printed matter cannot be controlled, saturation of the printing form with high-density ink unavoidably leads to oversaturation of the components with lighter elements in the sequence of intervals along the printing flow.

Newspaper-letterpress printing occurs when the impression cylinder and the plate cylinder come into contact. The hardness requirements for the surface of the impression cylinder vary widely. The printing plate can be secured in place magnetically or mechanically. The pressure in the nip between the printing cylinder and the plate cylinder is linear over the width of the cylinders and can be linearly controlled only to the right or to the left.

Since all the impression sites on a letterpress plate are in the same plane, the dynamic pressure on both the printing areas and the empty spaces is equally powerful, necessitating make ready. Negative elements must be considerably reduced, for example, in order to some extent to attain enough pressure to ensure more or less satisfactory coverage of the material being printed.

All of these additional measures are comparatively time-consuming and are in the final analysis of only limited use. Maintaining the lights, keeping the dots open in the depths, and ensuring the fidelity to the original of linear elements even when they are covered up in the printing plate, are practically impossible.

SUMMARY OF THE INVENTION

The particular object of the present invention is to optimize letterpress quality by expanding the reproduction potential of the existing screen area in both the light and in the deep areas by reducing the printing-accretion area, by means of closed coverage in the case of negative areas, and by attempting to retain fidelity of the reproduction potential to the original of all the graphics elements of the printing form.

It is a further object of the invention to provide an ink transport that is precisely quantitatively controlled in terms of reproduction requirements from a supply volume by way of a prescribed route while attaining requisite coverage on a printed material.

In the conventional newspaper rotary-letterpress process, specifically involving transporting the ink to a printing support by means of a fountain, inking the letterpress form, and releasing the ink from the printing plate to a material that is to be printed, accompanied by the action of an opposing force exerted by an impression cylinder, the ink is conveyed or transported in excess in order to apply the requisite volume of ink coverage on the printed material. The consequence of the squeeze resulting from the impression force that acts between the printing support and the impression cylinder is that some of the ink is forced against the side of the screen-patterned or even character-patterned printing surfaces and simultaneously also into the depths between the printing surfaces and more or less loads them, resulting in blurring of the screen dots or characters accompanied by splitting up of the ink.

It has, now, surprisingly been discovered that the objects of the invention can be attained in a printing form with impression sites formed of plastic, provided the critical surface tension of the ink-bearing impression sites is approximately 18–35 mN/m.

The design of the printing form in accordance with the invention advantageously restricts the amount of ink conveyed to the volume actually required in order to attain unobjectionable coverage of the printed material, eliminating the need for oversaturating the printing form with ink. The measure also reduces squeezing of the ink between the printing form and the impression cylinder by a corresponding amount, so that there will no longer be any squeezing beyond the edges of the screen in the vicinity of the screen, characters, etc., and accordingly no more loading of the depths, whereas the lights will be reproduced with sharp edges because the special properties of the printing form will occasion the ink to adhere exclusively to the area situated opposite while the application cylinder is being inked. In accordance with a take-up volume of ink that has been reduced to the requisite measure, the film of ink that forms will accordingly be comparatively thin, and it will be removed from the printing form at a lower nip pressure. The ink that is applied will be almost completely taken up by the printed material during the printing process, so that the printing form will be almost free of ink prior to the subsequent inking procedure.

The reduction of the surface tension of the printing form as measured in a known way to a low and advantageous level that is in each case as low as possible in terms of overall conditions will ensure practically complete release of the ink from the printing form and its transfer to the printed material, paper or a similar material for example, especially if the cohesion of the ink as well as the ink-uptake capacity of the printed material are sufficient, meaning that the force of adhesion between the ink and the printed material is more powerful than the force of adhesion between the ink and the printing form resulting from the surface tension, as is in any case generally true. This will also result in the absolute advantage that the spectrum of usable ink varieties will be considerably larger, that ink consumption and hence cost will decrease, and that, especially in multicolor printing, the decreased amounts applied will improve the quality of reproduction to a considerable extent. To the same extent that overall ink control becomes simplified due to the thinner film of ink, less paper will be wasted when paper is used in a conventional letterpress process. Finally, the lower nip pressure between the printing form and the impression cylinder will also considerably reduce mechanical stress on the rotary press.

When the printing form is not used to manufacture too high a number of the same printed products, provisions can be made to generate inked impression sites by subsequently dampening or spraying a previously structured printing plate or similar element with an appropriate plastic. When manufacturing a larger number of printed products, however, it is more practical to create the impression sites by subsequently shrinking a skin of plastic to a previously structured printing plate or similar element or, on the other hand, by elaborating them out of the solid by engraving or by means of a photochemical process. Care must be taken in any case to ensure that the ink-bearing impression sites, especially having a critical surface tension of approximately 18–35 mN/m and/or where the plastic at the ink-bearing impression sites has oil-repellent and water-repellent properties and low wettability in relation to ink, are thick enough for the requisite number of printed products.

When the printing forms are produced by engraving, that is by removing material, the layer of plastic that is engraved into a relief-establishing surface and that can be conventionally secured to a support by means of an adhesive layer, especially a steel support, can be made entirely out of a plastic with a very low critical surface tension or oil-and water-repelling properties or a low wettability for ink or can contain such high proportions of these as to attain the desired result. Appropriate plastics that have these properties that are desirable for the printing forms, especially printing plates, in accordance with the invention are fluoropolymers. Commercially available fluoropolymers are polytetrafluoroethylene (PTFE), polyvinylidene fluoride (PVDF), polytrifluorochlorethylene (PTFCE), poly(tetrafluoroethylene hexafluoropropene) (FEP), poly(tetrafluoroethylene ethylene) (ETFE), and poly(tetrafluoroethyleneperfluoroalkylperfluorovinyl) ether. Polytetrafluoroethylene and copolymers of tetrafluoroethylene, especially with hexafluoropropylene, are preferred for the purposes of the invention. Polytetrafluoroethylene, with a critical surface tension of 18 mN/m (M. Michel, Adhäsion 11 [1983], 11–13, with further discussion, especially as to the method of determination), turns out to be especially appropriate.

Also appropriate for the invention and usually less expensive and easier to process are the polyolefins, especially the polymers of ethylene and/or propylene such as polyethylene (PE) or polypropylene (PP), when they have the surface properties requisite for the invention. The same is true of diene elastomers, which in that case can be primarily employed for flexography.

Alternatively, the *Polymer Handbook,* Third Ed., J. Brandrup and E. H. Immergut Editors, John Wiley & Sons (1989) reveals (page VI/420) that poly(oxyethylene-*stat*-oxypropylene), a block copolymer containing polysiloxane in the range of 4.6 to 32.6 weight percent, exhibits a surface tension in the range of 28.0 to 20.5 mN/m, respectively, at 25° C.

An epoxy resin of diglycidyl ether of bisphenol-A with 0.5 weight percent of γ glycidoxypropyltrimethoxysilane, both cured and uncured, exhibits a surface tension in the range according to the present invention. The uncured resin exhibits a surface tension of 32.9 mN/m at 20° C. This surface tension can be lowered by curing, depending upon the curing agent as shown in the following Table I:

TABLE I

| Curing Agent | Surface Tension 20° C. |
| --- | --- |
| γ-aminopropyltrimethoxysilane | 25.5 |
| N,N-dibutylaminopropylamine | 25.3 |
| N,N-diethylaminopropylamine | 24.6 |
| N,N-dimethylaminopropylamine | 23.9 |
| N-methylaminopropyltrimethoxysilane | 27.0 |
| γ-glycidoxypropyltrimethoxysilane | 23.9 |

Certain poly(imines) also exhibit extremely low critical surface tension as set forth in the following Table II:

TABLE II

| Polymer | Surface Tension (20° C.) |
| --- | --- |
| Poly((benzoylimino)ethylene) | 26 |
| Poly(butyrylimino)ethylene) | 25 |
| Poly((dodecanoylimino)ethylene) | 22 |
| Poly((dodecanoylimino)ethylene-stat-acetylimino)trimethylene) | 22 |
| Poly((heptanoylimino)ethylene) | 22 |
| Poly((hexanoylimino)ethylene) | 23 |
| Poly(((3-methyl)butyrylimino)ethylene) | 24 |
| Poly((pentadecafluorooctadecanoylimino)-ethylene | 11 |
| Poly((pentanoylimino)ethylene) | 23 |

And finally, poly(siloxanes) also exhibit low surface tension as indicated in Table III:

TABLE III

| Polymer | Surface Tension (20° C.) |
| --- | --- |
| Poly(oxydimethylsilylene.α,ω-difunctional R—(Si(CH$_3$)$_2$—O—)$_m$Si(CH$_3$)$_2$—R R = (CH$_2$)$_3$NH$_2$ M$_m$ = 1,132 | 21.00 |
| R = (CH$_2$)$_3$COOH M$_n$ = 2,194 | 20.54 |

The layer that constitutes the relief (the printing elements, that is) can be created by electron-beam engraving or laser engraving. Corresponding devices that satisfy present-day demands with respect to rapid production of the printing forms exist for the two latter methods of electronic image processing. They are appropriate not only for producing printing forms for letterpress or flexography with printing elements of 300 to 800 μm but also for rotogravure with printing forms made of the aforesaid plastics. For letterpress, including its flexography variant, the printing elements do not need to consist to their full thickness of the plastic with the properties that are desirable for the ink-bearing impression sites. It is sufficient for these sites to be thick enough to ensure the desired length of run. Depending on the wear on the polymer layers, from a few to approximately 100 μm, between 10 and 50 μm for example, can be sufficient.

There are in practice various photochemical methods of generating the relief-constituting layer of a printing form. Either a legible and exploitable record of information is directly obtained by the action of radiation or a latent image is converted into a usable record by means of a development stage.

There are essentially three systems, specifically structures that dimerize, polymerize, or become depolymerized subject to the action of light. The two former methods result in polymers that become insoluble due to the action of light, whereby the unexposed areas can be dissolved away with solvents, aqueous solutions, or water. In depolymerization the radiation breaks up the molecules of the polymer. The smaller-molecular components obtained by fragmentation with ultraviolet light or ionizing radiation dissolve more readily than the starting polymers and can be dissolved away with appropriate solvents.

Of the highest practical significance are photopolymerizable materials, which usually consist of a water-soluble or water-dispersible polymer with ethylenically unsaturated photopolymerizable or photocrosslinkable groups, a photoinitiator or photosensitizer, and conventional non-photopolymerizable auxiliaries or additives (German Patent Publication No. 3 322 994 & European Patent No. 131 294). The actinic rays activate the photoinitiator, which induces the polymerization or crosslinkage. Polymerized and non-polymerized areas are accordingly created in the irradiated layer in a distribution that matches the light and dark areas in the pattern being illuminated. A relief-constituting layer is then obtained by treating with an appropriate solvent that dissolves the unpolymerized or uncrosslinked material out of the unirradiated areas but not the polymers out of the illuminated areas of the image.

To make them easier to handle, the commercially available printing plates with a layer of light-sensitive plastic usually contain water-soluble or water-dispersible derivatives of polyvinyl alcohol, which, although they can be developed with water or aqueous solutions, prevent the printing elements in the relief-constituting layer from being too readily attacked by aqueous media, so letterpress plates of this type are used for printing, especially newspaper letterpress printing, only with inks that contain oil and not with emulsion inks. Since a water-soluble or water-dispersible plastic is also necessarily hydrophilic and easy to wet, for the purpose of the invention it requires a higher proportion of oil-repellent and water-repellent plastic with the requisite lower critical surface tension or an appropriately permanent modification, at least at the surface of the printing elements.

For the purposes of the invention, accordingly, basic polymers that become less wettable with ink as the result of photodimerization or photopolymerization or that, in the case of photodepolymerization, are naturally relatively oil-repellent and have a lower critical surface tension will be preferred.

The requisite low critical surface tension can be obtained at least for the impression sites but also in certain situations for the impression sites as a whole by embedding fine particles of polymers, especially fluoropolymers, with low critical surface tension.

Particularly fine particles of PTFE, with a diameter of, e.g., 10 to 30 μm or slightly more, are dispersed for example into the polymer, at least in the vicinity of the impression sites. Powders of this type are commercially available and can be incorporated into the photocrosslinking or photodepolymerizing plastic, even as early as during polymerization.

Another approach to modifying the photochemically variable material to ensure that the printing elements or at least the impression sites that remain subsequent to development will exhibit the properties desirable in accordance with the invention is to modify the polymers by inserting chemical groups that are known to decrease the critical surface tension of plastics. Perfluoroalkyl groups are particular examples. Instead of modifying the plastic in the relief-establishing surface to produce the desired surface tension even while it is being manufactured or, at the latest while it is being illuminated, it is possible to subsequently treat the impression sites or the surface of the printing elements in their existing relief layer with appropriate chemical agents in order to decrease critical surface tension and wettability to the desired range of 18 to 35 mN/m.

DETAILED DESCRIPTION OF THE DRAWINGS

Figure 1:
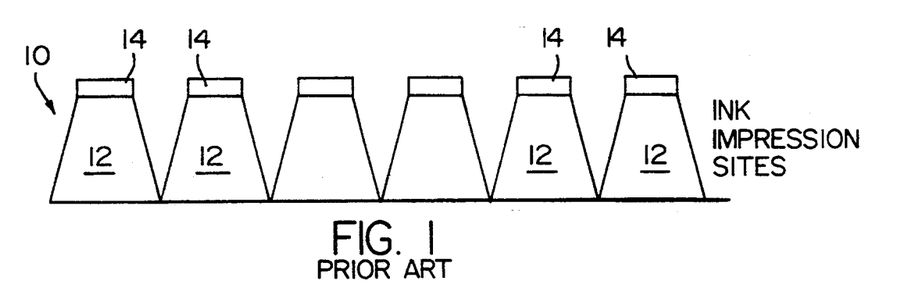
FIG. 1 is a representational diagram of a prior art printing plate with inked impression sites.
Figure 2:
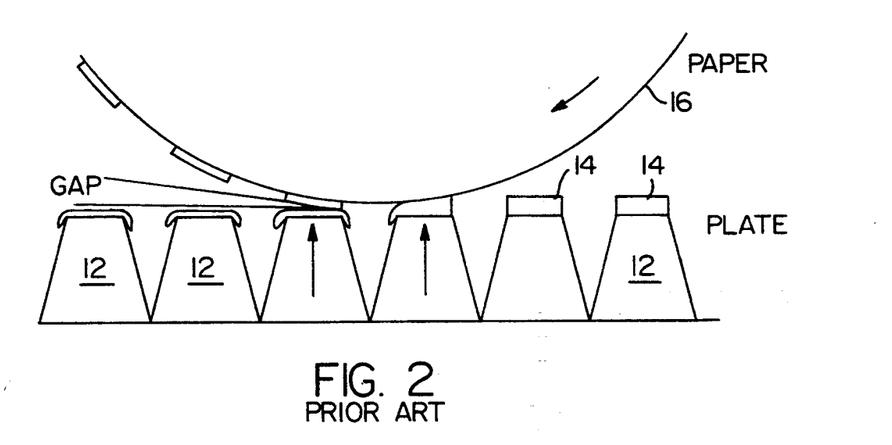
FIG. 2 is a representational diagram of the printing plate of FIG. 1 during the printing process in accordance with the prior art.
Figure 3:
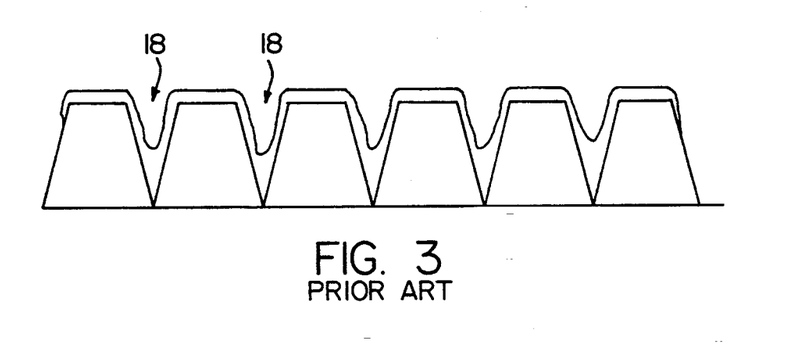
FIG. 3 is a representational diagram of the printing plate of FIG. 2 after repeated printing.

FIGS. 1–3 illustrate the principal problem of letterpress printing which is overcome by the printing method according to the present invention.

FIG. 1 shows a printing plate 10 having a plurality of impression sites 12 on which are deposited a layer of ink 14. When the printing plate is new, the ink is deposited only on the printing surfaces of the impression sites.

During printing, as shown in FIG. 2, a gap is formed in the ink 14 such that less than all the ink is transferred to the paper 16. Ink left on the impression sites 12 builds up during repetitive printing and, as shown in FIG. 3, enters the spaces 18 between the impression sites.

Figure 4:
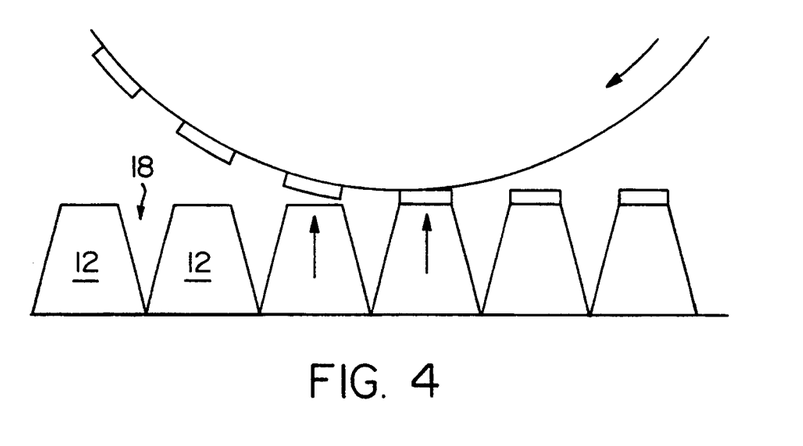
FIG. 4 is a representational diagram of the printing plate during the printing process according to the present invention.
Figure 5:
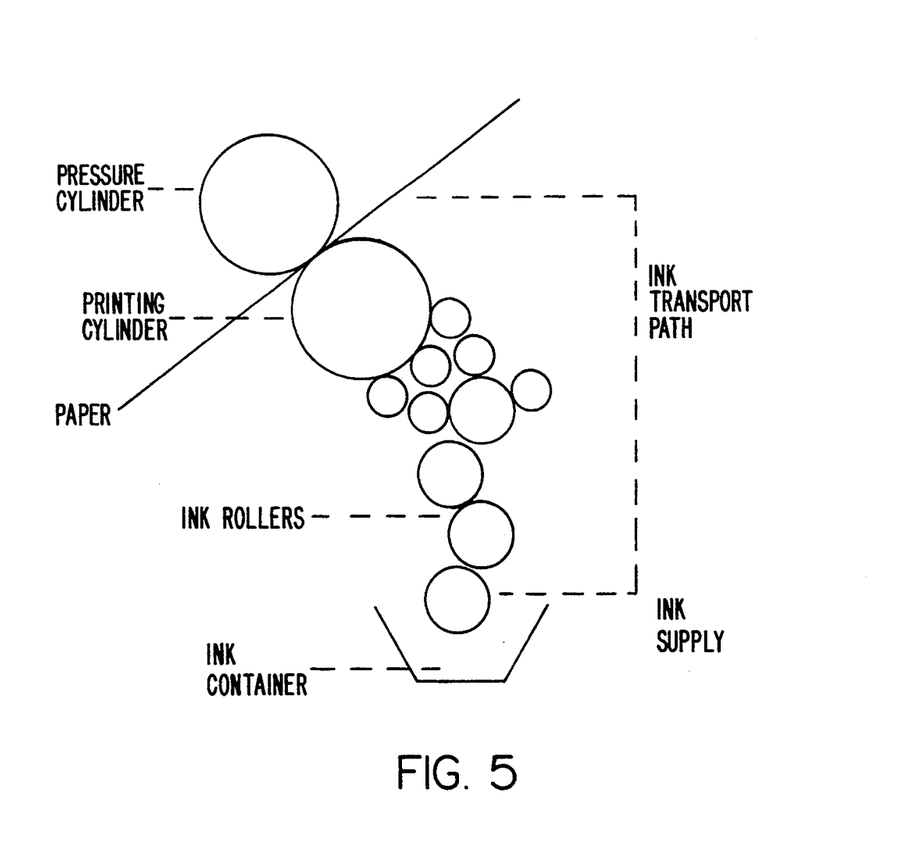
FIG. 5 is a representational diagram of a letterpress printing machine.

According to the invention, ink preferentially transfers to the paper and does not remain on the impression sites 12 during the printing process as shown in FIG. 4. As a result, the ink does not have a tendency to accumulate in the spaces 18 between the impression sites. The print quality thus remains high, even in the case of letterpress printing which is diagrammed in FIG. 5.

Figure 6:
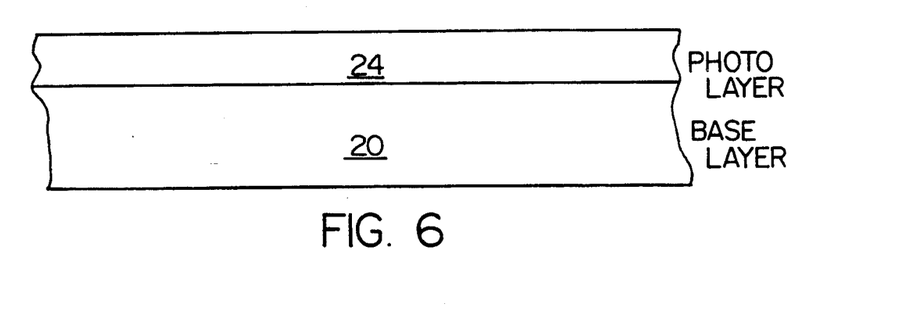
FIG. 6 is a cross-sectional view of printing plate having a plastic surface comprising a fluoropolymer in accordance with the present invention.
Figure 7:
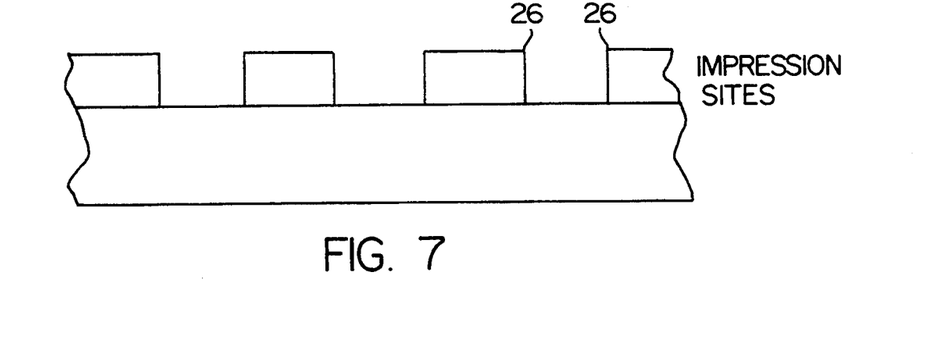
FIG. 7 is a cross-sectional diagram of the printing plate of FIG. 6 in which a relief on the surface has been formed by a photochemical process.
Figure 8:
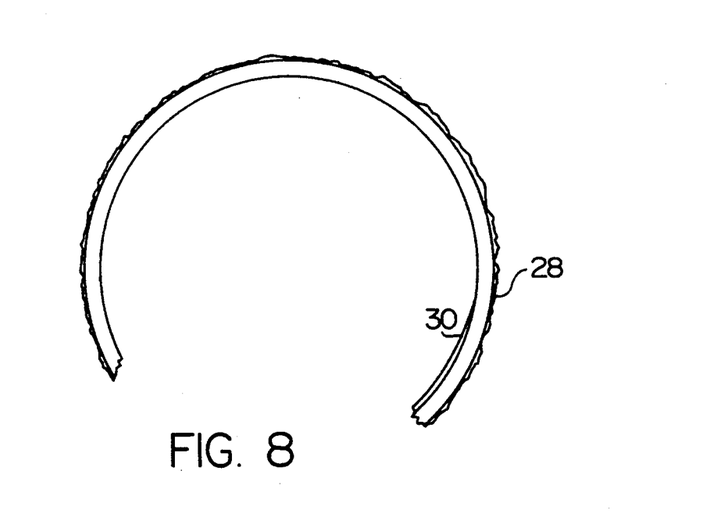
FIG. 8 is a cross-sectional diagram of a printing cylinder on which is wrapped the printing plate of FIG. 7.

According to the invention, a relief is produced in the surface of a printing plate in the following manner:

As shown in FIG. 6, a printing plate comprises a base layer 20 and a photolayer 24 of a fluoropolymer such as PTFE. The photolayer is subjected to a photochemical process, as is well known in the art; it is selectively etched away to produce the impression sites 26, as shown in FIG. 7. Since the plate is thin and flexible, it can be wrapped around and secured to a printing cylinder as indicated by the plate 28 on the cylinder 30 in FIG. 8.

PRINTING TESTS

The advantages of the present invention have been demonstrated with a series of tests, some carried out in very difficult and makeshift conditions. One test was conducted for example with a polytetrafluoroethylene film or sheet that is known for its extremely low surface tension. The film was engraved with a grid-like pattern in a device intended for film editing and in which it could be secured only unsatisfactorily. It was impossible to evaluate the screen dots because the film did not permit a uniform inking. Nevertheless a minimal incision was undertaken in order to evaluate openness in the depth.

For the printing test the film was mounted on a steel support by means of double-sided adhesive tape, and the previously employed ink was manually reduced with 30% water to obtain more rapid ink absorption.

The test was intended to confirm complete saturation of negative areas and to decide to what extent the screen values could be kept open in the depths. The expected results were confirmed in spite of the unsatisfactory setup. They included absolute ink coverage, a practically complete inhibition of ink splitting, and an openness of 12 to 15 $\mu$ in the depths.

Other phenomena were also confirmed. Ink-flow control could be substantially reduced. It was necessary to work with the flow regulator only up to 70% open and a constant doctor speed over almost 1 ¾ pages as against twice the doctor speed with the ink-flow regulator completely open in the conventional approach. It was also possible to extensively reduce nip pressure. Finally the composition of the ink was varied to obtain more rapid ink coverage at startup.

A type of ink that had been rubbed up at the factory was also tested. The mixing ratio was obtained by adding 30% water. The intention was to study ink control and measure the density of the ink. The results were densitometrically obtained densities of 1.01 to 1.12.

A solid ink was tested in another printing test to determine how well the ink would adhere to the printing plate. The upper-level strips on the printing plate were raised 0.2 mm to allow determination of the effects on ink uptake and printing results.

The results indicated that the same ink residue was present at both levels subsequent to printing and that increasing the nip pressure had no effect on ink density. The densitometric densities were exactly the same, meaning that a higher printing tension does not effect printing results.

Another test involved two inks, one of which was a colored ink with high flow properties. The only purpose of the test was to investigate the ink. With respect to inking and ink consumption the results confirmed those of the prior printing tests.

In summary, these tests make it possible to say that the design of the ink fountain is of only subsidiary significance in the procedure in accordance with the invention and that even problems in relation to inking can be considered as neutralized. Thus, no changes in the printing of solid areas were visually apparent when the existing third inking roller was removed.

In relation to the printing process the nip pressure could be considerably reduced, and color splitting was practically eliminated.

The conveyance of ink remains advantageously restricted to the amount needed for coverage of the printed material in accordance with the demands of reproduction, eliminating oversaturation of the printing plate. The depths do not load up in the screen area, and the lights are reproduced with sharp edges because the special properties of the plate occasion the ink to adhere only in the areas that are in the same plane as the surface of the inking roller during the inking process.

The thin film of ink and the low nip pressure that occurs during the printing process decreases the compression of the ink to the same percent as the decrease in the volume of ink applied and the reduction of nip pressure.

The applied ink is almost completely taken up by the printed material during the printing process, and the printing plate is as good as free of ink for the next inking process.

The design of the printing plate in accordance with the invention results in a printing quality in newspaper letterpress that matches a good offset quality. It is unnecessary to change any aspect of the machinery. Thus, it is not necessary to adjust the height of the inking rollers or to vary the elevator range.

The test printing was done with elevators that had a life of almost two years with nylon printing plates behind them and with inking rollers that had been in the machine for six years.

With respect to the type of ink it should be mentioned that both pure mineral-oil inks and emulsion inks—that is, inks containing water—were employed in the tests in that the maintenance and stability of the ink was to be tested. The latter type was employed in various versions with respect to flowability. The printing results were just as satisfactory. It did, however, turn out to be an advantage to use emulsion inks with high flowability because they result in more rapid inking, a thinner film of ink, a decrease in the rubbing process and volume, a more rapid release in the inking process, better adhesion to the printing plate and, due to the decreased amount of ink, in simpler takeover on the part of the printing plate.

The principle of decreasing the ink-takeover behavior on the part of the printing plate by reducing surface tension to the lowest possible level that is the basis of the invention promotes application of only a small amount of ink, and the good flowability of the ink makes it possible to optimally carry out the inking process in a very short time. The consequence of the low ink-uptake friendliness of the printing plate, with the result that, even at a low nip pressure between the printed material and the inked printing plate, the ink will adhere to the material and release from the surface of the plate.

Finally, a number of continuous printing tests were conducted to confirm the quality of newspaper print in accordance with the principles of the present invention. The goals of these tests were as follows:

(a) A reduction in the conveyance of excess ink;
(b) The substantial elimination of the "ink splitting" process during printing;
(c) The maximum deposition of ink from the printing plate to the paper; and
(d) A uniform coverage of the paper with printing ink.

These tests were conducted using impression sites on the printing plates which exhibited ten different critical surface tensions in order to investigate the relationship of surface tension to the goals indicated above. The tests were conducted on a newspaper letterpress printing machine under normal high speed printing conditions. Except for varying the impression site material, all the printing parameters were held constant. The impression sites were formed in each case by engraving by means of a laser beam.

Initially, two page size full tone plates of PTFE plastic having a critical surface tension of 18 to 20 mN/m were provided on the press. The quantity of ink supply and the printing pressure were optimally adjusted to this material. After the printing conditions were properly set, one of the two plates was exchanged for a plate comprising the test material. The quantity of ink, the printing pressure and all other printing parameters remained unchanged.

The tests were conducted with a mineral oil printing ink emulsified with 30% water and a newsprint quality paper with a weight of 48.8 g/m².

The impression site materials used in the test, listed by Sample Group number and with their associated critical surface tension, are set forth in Table IV below:

TABLE IV

| Printing Sample Group | Material | Surface Tension (mN/m) |
| --- | --- | --- |
| 1 | PTFE (First Sample) | 18–20 |
| 2 | PE (polyethylene) | 31 |
| 3 | PVC | 39–40 |
| 4 | Mylar | 43 |
| 5 | Photopolymer (water soluble) | over 45 |
| 6 | PTFE (Second Sample) | 18–20 |
| 7 | Photopolymer (alcohol soluble) | over 45 |
| 8 | Novolen (polypropylene) | 31 |
| 9 | Caoutchouc (rubber) | 29.3 |
| 10 | Styrolux (polystyrol) | 33 |

The printing samples produced by the tests were evaluated by ten professionals in the printing field, based on five characteristics of printing quality. These characteristics were:

(a) Incomplete surface coverage;
(b) Coating of paper threads;
(c) Cloudiness of the print image;
(d) Density of the image; and
(e) General impression of the printed surface.

Each characteristic was evaluated on a scale of 1 to 5 where 1 represented the highest quality. The ten printing samples where designated with only a number to avoid prejudicing the results. Each evaluator provided a score from 1 to 5 for each of the printing characteristics listed above, and the entries made by all ten evaluators were tallied. The points assigned by the ten evaluators were added together for each Sample Group and the sum for each group was divided by 10 to give the average. The results of this evaluation are set forth below in Table V.

TABLE V

| Material Group | Total Points | Quality Grade Average |
| --- | --- | --- |
| 1 | 10.0 | 1.00 |
| 2 | 24.0 | 2.40 |
| 3 | 47.5 | 4.75 |
| 4 | 42.0 | 4.20 |
| 5 | 38.5 | 3.85 |
| 6 | 10.0 | 1.00 |
| 7 | 47.5 | 4.75 |
| 8 | 20.5 | 2.05 |
| 9 | 19.0 | 1.90 |
| 10 | 34.0 | 3.40 |

Considering Table V, it may be seen that the lowest critical surface tension of the printing impression sites leads to the highest printing quality. The printing quality falls off substantially after a surface tension of approximately 35 mN/m.

It is understood that the specification and examples are illustrative but not limitative of the present invention and that other embodiments within the spirit and scope of the invention will suggest themselves to those skilled in the art.

What is claimed is:

1. A letterpress printing method comprising the steps of:
    (a) providing a printing plate having a plastic surface with a critical surface tension substantially in the range of 18–35 mN/m, said plastic surface comprising a fluoropolymer;
    (b) creating a relief in said surface of said printing plate to form raised ink-bearing impression sites by a photochemical process which includes a photochemical reaction; and
    (c) printing with said printing plate using a letterpress type printing machine.

2. The printing method defined in claim 1, wherein said printing step uses an emulsified ink that contains at least 10% water.

3. The printing method defined in claim 1, wherein said ink contains no oil.

4. The printing method defined in claim 1, wherein said photochemical process includes the step of photodimerization.

5. The printing method defined in claim 1, wherein said photochemical process includes the step of photopolymerization.

6. The printing method defined in claim 1, wherein said photochemical process includes the step of photodepolymerization.

7. The printing method defined in claim 1, wherein the plastic comprises polytetrafluoroethylene.

8. The printing method defined in claim 1, wherein the plastic comprises a copolymer of tetrafluoroethylene and hexafluoropropylene.

9. A printing plate for use with a letterpress type printing process having ink-bearing impression sites oil with plastic surfaces, the improvement comprising:
(a) the plastic surfaces of the ink-bearing impression sites having a critical surface tension substantially in the range of 18–35 mN/m;
(b) the impression sites being formed from a photochemical relief layer; and
(c) the impression sites in tile relief layer further containing a fluoropolymer and a chemical group to adjust the critical surface tension of tile polymer.

10. The printing plate defined in claim 9, wherein the chemical group is a perfluoroalkyl group.

* * * * *

UNITED STATES PATENT AND TRADEMARK OFFICE
CERTIFICATE OF CORRECTION

PATENT NO. : 5,396,841
DATED : March 14, 1995
INVENTOR(S) : Dieter Guls It is certified that error appears in the above-identified patent and that said Letters Patent is hereby corrected as shown below:

Col. 11, line 2   Delete " oil "

Signed and Sealed this

Thirtieth Day of May, 1995

Attest:

BRUCE LEHMAN

*Attesting Officer*          *Commissioner of Patents and Trademarks*